United States Patent [19]
Barreto

[11] Patent Number: 6,151,811
[45] Date of Patent: Nov. 28, 2000

[54] RETRACTABLE ASSEMBLY FOR TRENCHERS AND WALK-BEHIND POWER UNITS

[76] Inventor: Greg Barreto, 66498 Oregon Highway 203, LaGrande, Oreg. 97850

[21] Appl. No.: 09/185,387

[22] Filed: Nov. 3, 1998

[51] Int. Cl.[7] .............................. A01B 33/02; A01B 35/32
[52] U.S. Cl. ............................... 37/352; 37/462; 172/43; 172/90; 172/123
[58] Field of Search ............................... 37/352, 347, 466, 37/462, 464, 189; 172/43, 17, 78, 79, 90, 123

[56] References Cited

U.S. PATENT DOCUMENTS

| | | | |
|---|---|---|---|
| 351,930 | 11/1886 | McAnlis | 37/352 |
| 2,231,983 | 2/1941 | Zuckerman | 37/352 |
| 2,519,076 | 8/1950 | Schmidt | 37/352 |
| 2,817,167 | 12/1957 | Barber | 37/86 |
| 2,835,055 | 5/1958 | Hermes | 37/86 |
| 2,846,786 | 8/1958 | Barber et al. | 37/352 |
| 2,946,142 | 7/1960 | Swanson | 37/80 |
| 2,990,631 | 7/1961 | Brown | 37/86 |
| 2,997,276 | 8/1961 | Davis | 254/166 |
| 3,057,088 | 10/1962 | George et al. | 37/86 |
| 3,087,354 | 4/1963 | Malzahn | 74/781 |
| 3,448,812 | 6/1969 | Peters | 172/43 X |
| 3,834,049 | 9/1974 | Bond | 37/86 |
| 4,015,668 | 4/1977 | Wilson | 172/43 X |
| 4,103,441 | 8/1978 | Flippin | 37/86 |
| 4,322,899 | 4/1982 | Clune | 37/86 |
| 4,336,760 | 6/1982 | Cohen et al. | 172/43 X |
| 4,483,084 | 11/1984 | Caldwell et al. | 37/86 |
| 4,833,797 | 5/1989 | Slunecka et al. | 37/86 |
| 4,896,442 | 1/1990 | Stiff et al. | 37/86 |
| 4,913,581 | 4/1990 | Weiler | 404/117 |
| 5,119,880 | 6/1992 | Zehrung, Jr. et al. | 172/43 X |
| 5,228,221 | 7/1993 | Hillard et al. | 37/355 |
| 5,301,757 | 4/1994 | Kelley, Jr. | 172/43 X |
| 5,353,529 | 10/1994 | McCullough | 172/43 X |

FOREIGN PATENT DOCUMENTS

| | | | |
|---|---|---|---|
| 452103 | 10/1948 | Canada | 172/43 |
| 997180 | 1/1952 | France | 172/43 |
| 333135 | 2/1921 | Germany | 172/43 |
| 43-721 | 1/1968 | Japan | 172/43 |
| 58-91238 | 5/1983 | Japan | 37/352 |
| 56427 | 6/1944 | Netherlands | 172/43 |
| 1178852 | 9/1985 | U.S.S.R. | 37/352 |
| 1696650 | 12/1991 | U.S.S.R. | 37/352 |
| 528807 | 11/1940 | United Kingdom | 172/43 |
| 1441015 | 6/1976 | United Kingdom | 172/43 |

*Primary Examiner*—Christopher J. Novosad
*Attorney, Agent, or Firm*—Ken J. Pedersen; Barbara S. Pedersen

[57] ABSTRACT

The present invention is a walk-behind power unit stabilizing system for use on portable trenchers and other equipment. The preferred application comprises a retractable wheel assembly mounted at the rear of a trencher where the invented device is allowed to be maneuvered by the user from a lower, stabilization position to an upper, transport position. The device has a handle that allows the user to move the device from the upper, transport position to the lower, stabilized position, and vice versa, easily by raising and lowering the handle, either by hand or by moving the handle up or down using the user's foot. Some of the main benefits of the invented device include: ease of use; a reduction in the physical labor required to operate a trencher; stability; the ability to more consistently control the depth at which the trench is dug; an increased ability to traverse perpendicular trenches; increased force exerted on the boom when inserting the boom into the ground; and trench straightening.

20 Claims, 6 Drawing Sheets

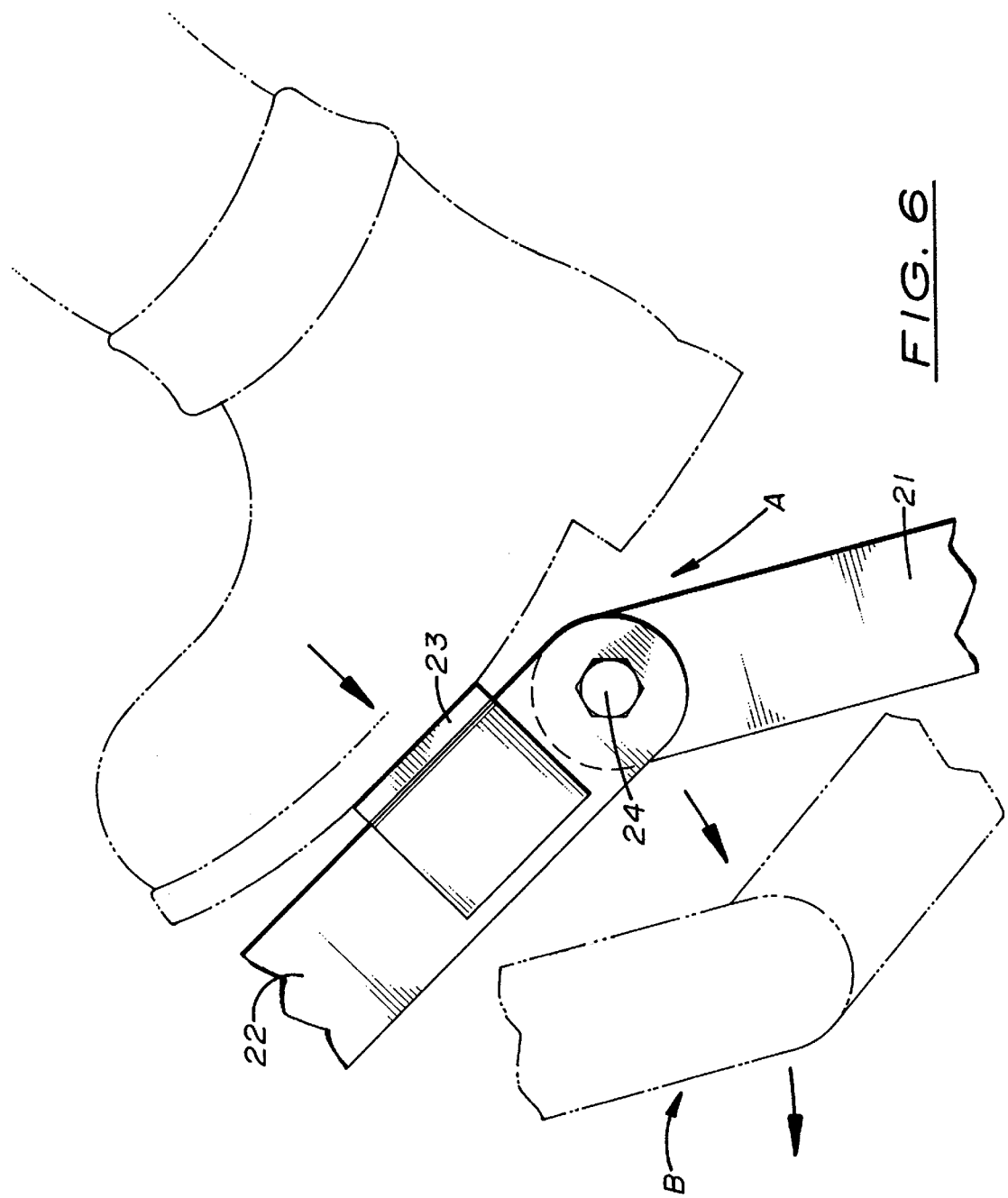

RETRACTABLE ASSEMBLY FOR TRENCHERS AND WALK-BEHIND POWER UNITS

BACKGROUND OF THE INVENTION

1. Field of the Invention

This invention generally relates to digger and trencher equipment. More specifically, the present invention is a retractable assembly for use on portable diggers and trenchers used to add stability to the digger or trencher equipment while such equipment is in use.

2. Related Art

Many types of digger and trencher equipment ("trenchers") are disclosed in the prior art. These trenchers encompass many different types: from large, industrial trenching apparatuses used for the creation of very large and very deep trenches; to smaller, portable apparatuses used for smaller trenches. The present invention generally concerns portable diggers and trenchers, but may be used on industrial trenching apparatuses.

Of these portable trenchers, there are three main types: those which are an attachment for another vehicle or piece of equipment, those which have two main wheels and those which have four or more main wheels.

Portable trenchers can be attached to other vehicles and equipment. An example is U.S. Pat. No. 4,833,797 (Slunecka), which discloses a trencher attached to a steerable, self-propelled, wheeled tractor. The benefit in such an attachment is the fact that the trencher can be used anywhere a tractor can tow it. However, the need to use a separate vehicle, such as the tractor, to operate such a device greatly reduces the device's ease of use, and causes difficulties in using the device in confined places. Other examples of such attached equipment include: U.S. Pat. No. 4,483,084 (Caldwell); U.S. Pat. No. 3,834,049 (Bond); and U.S. Pat. No. 2,817,167 (Barber).

As mentioned above, portable trenchers may also have two main wheels. Such portable trenchers may also have a smaller, third wheel near the front of the trencher for added stability, as shown in U.S. Pat. No. 5,228,221 (Hillard). Other examples of portable trenchers with dual main wheels include: U.S. Pat. No. 2,997,276 (Davis); U.S. Pat. No. 3,087,354 (Malzahn); U.S. Pat. No. 4,322,899 (Clune); and U.S. Pat. No. 4,103,441 (Flippin).

The benefit of using a trencher with two main wheels is maneuverability. Being able to pivot on two wheels give such trenchers a very small turn radius, a feature that is very useful in digging multiple and curved trenches.

A drawback of such two main wheeled trenchers involves digging arch and kickback. As the bladed boom of the trencher is inserted and used in the soil to dig a trench, the front portion of the trencher in relation to the rear portion tends to raise up (digging arch) and jerk backward (kickback) when the bladed boom strikes buried stones and tree roots.

Finally, portable trenchers may have four or more main wheels. These trenchers range from small vehicles with built-in trenchers, to small, portable trenchers having four or more wheels. The benefit of having at least four wheels is that the trencher is very stable and does not suffer from digging arch or kickback to such a large degree as portable trenchers with two main wheels do. However, the drawback of such trenchers with four or more main wheels is the lack of ease of use and maneuverability, especially in tight corners or where multiple trenches and curves are required. Examples of such trenchers include: U.S. Pat. No. 4,913,581 (Weiler); U.S. Pat. No. 2,946,142 (Swanson); U.S. Pat. No. 4,896,442 (Stiff); U.S. Pat. No. 2,990,631 (Brown); U.S. Pat. No. 2,835,055 (Hermes); and U.S. Pat. No. 3,057,088 (George, et al.).

Thus, there is a need to create a trencher which combines the maneuverability and ease of use of the portable trenchers with two main wheels with the stability and resistance to digging arch and kickback of portable trenchers with four or more main wheels.

SUMMARY OF THE INVENTION

The present invention is a retractable walk-behind power unit stabilizing system assembly for use on walk-behind power equipment, such as portable trenchers. Walk-behind power units have a front side, a rear side, and at least one rear drive wheel near the rear side of the body of the power unit. A portable trencher generally comprises a trencher body having an engine and wheels, and a trenching boom having a trenching chain. The present invention comprises a retractable wheel or other bracing assembly mounted at the rear of a trencher, behind and spaced from the rear drive wheels, and extending downward from there. Preferably there is no other apparatus touching the ground behind the invented assembly. The invented assembly is allowed to be maneuvered by the user from a lower, stabilized position, where the invented wheel or other brace contacts the ground, to an upper, transport position. While the preferred embodiment of the present invention is to be used on trenchers of the two main wheeled variety, use on other trenchers and even other equipment is also envisioned by the inventor. Preferably, the invented assembly contacts the ground at least six inches behind the rear drive wheels.

The preferred embodiment comprises at least one wheel and a retractable system for connecting the wheel to the trencher or equipment body and for moving the wheel into the upper and lower positions. The retractable system may include pivoting, articulated, hinged, sliding or other moveable linkages. Generally, the linkage moves the wheel upward and downward within a vertical plane. A lock system, suspension system, drive system, and additional support system may be included to further optimize the invented device.

The present invention is preferably a separate wheel assembly device mounted at the rear of the trencher. Such mounting is done so that the device's wheel or wheels are oriented in the same direction as the other wheels of the trencher. While two wheels are envisioned in the preferred embodiment, the inventor also envisions embodiments using more or fewer wheels than two.

The device can easily be moved from the upper, transport position to the lower, stabilized position, and vice versa. Movement from the upper position to the lower position is simply done by the operator using his/her foot to push downward on the toe-kick bar which moves the device lower and then locks the device into a lower position. As the toe-kick bar is pushed lower by the foot of the user, tension caused by retraction springs is overcome, thereby allowing the device to be moved into the lower position. As the toe-kick bar is pushed lower, the device moves downward, approximately until the wheels of the device touch the ground. At this point, the device locks into place within the lower, stabilized position. This lock must be released before the user will be able to raise the device into the other, upper position.

To move the device to the upper position, the user merely needs to use his or her foot to push in on the disengagement flange. As the disengagement flange is pushed in, in the direction of the front of the trencher, the device is unlocked from the lower position. Once the device is moved out of this position, the user can remove his/her foot from the disengagement flange and the device will retract automatically by the retraction of the retraction spring or springs. While the preferred embodiment uses two retraction springs, the inventor envisions that any number of retraction springs, or even other lifting means, such as hydraulics, could be used in other embodiments.

The trencher can be stored or transported in or on a vehicle in either the upper or the lower position. However, the lower, stabilized position is preferred for its stabilizing properties, in that it keeps the trencher in better contact with the surface it is being transported on or over, for instance a trailer.

In use, the portable trencher is first maneuvered into position. During such maneuvering, the invented device is positioned into the upper, transport position. Maneuvering the trencher into position can be done either by manually pushing, pulling and directing the trencher into place or through steering the trencher and using the trencher's built-in wheel drive, if the trencher has such a capability. Because the preferred embodiment has driven wheels, the user may opt to move the trencher into the general area to be trenched while the device is in the lower, stabilized position in order to use the invented device's driven wheels for increased traction and power.

When the user maneuvers the trencher into the general area in which the user intends to create a trench, the user then disengages and retracts the device to allow the device to be moved into exact place by pivoting upon the trencher's two main wheels. The trencher can be pivoted on its two main wheels and maneuvered to the exact location where the user intends to dig the trench. When the user determines that the portable trencher is in place, the retractable wheel assembly is moved into the lower, stabilized position, and is then locked into this lower position.

When the operator of the trencher is finished using the trencher, or wishes to move the trencher to another location, the operator merely needs to unlock the invented device, and the retraction spring or springs will lift the invented device into the upper position. The user could then pivot and steer the trencher to the desired next location using only the two main wheels, or the user could pivot the trencher into the desired direction, then lower and engage the device's wheels, thereby allowing the user to move to the next location by using "four-wheel" drive.

Any such pivoting on the two wheels done by the user may require the user to slightly apply downward force to the rear of the trencher unit, preferably through pushing down on the trencher's maneuvering handles, so that the front leading wheel, if present, is picked up off the ground. This allows the trencher to pivot more freely.

A main benefit of the invented device is that in the lower, stabilized position, the trencher becomes more stable due to the fact that the trencher no longer experiences digging arch, and kickback is greatly reduced. Both digging arch and kickback make the use of a trencher a physically demanding task, especially in rocky soil. With the present invention, the trencher becomes much easier to operate and is considerably less physically strenuous.

As mentioned before, digging arch happens when the trencher chain, while in the ground, strikes a rock or other item, causing the front of the trencher to arch up in relation to the digging chain and the rear of the trencher. Such arch is caused by the trencher pivoting at the trencher's main wheels. The present invention eliminates this pivot point through the addition of an additional wheel or wheels to the rear of the trencher's two main wheels. Not being able to pivot at this location results in the elimination of digging arch.

Kickback is the jerking and jarring motion caused by the trencher chain striking firm soil or small rocks. This kickback increases the physical exertion required to operate the trencher. In the present invention, this kickback is greatly reduced by the use of a suspension system having at least one suspension spring and/or at least one shock absorber. This suspension system greatly reduces these jerking and jarring motions through absorbing them.

An additional benefit of the invented device is depth management. Maintaining a consistent depth using a traditional portable trencher is difficult. This is due to the fact that the trencher pivots within a vertical plane at the attachment point of the two main wheels. As the trencher digs deeper and strikes soils of differing densities, it pivots along the wheel pivot, making it difficult to maintain a constant depth. This is because, depending on the degree of pivot at the wheel, the greater the depth the trencher bar and chain are inserted in the ground, which results in a trench of varying depth. However, if the invented device is used, the center of gravity for the trencher shifts behind this wheel pivot, thereby eliminating this pivoting action and allowing the trencher to dig at a constant depth.

Another benefit of the invented device is the increased ability to traverse generally perpendicular trenches. Sometimes, a user may create multiple trenches. In doing so, the trencher may need to be transported across trenches already dug. As a traditional trencher traverses such trenches, the two main wheels of the trencher may become stuck within a previously-dug trench.

If the trencher is being used in really rocky soil, the trenches dug may end up being wider than the trencher chain would normally dig. This is due to the fact that the walls of the trench tend to collapse into the trench as the digger chain removes large rocks. This collapse results in wide trenches which are difficult to cross with trenchers of the two main wheeled variety. By adding an additional wheel or wheels, especially if such wheel or wheels are driven, the trencher can traverse multiple and wide trenches much more easily due to the fact that the trencher's wheel base is lengthened.

An additional benefit of the invented device is improved ground insertion of the trenching boom and chain. In traditional two main wheeled trenchers, due to the fact that the trencher pivots at the two main wheels as the boom and chain in inserted into the ground, the trencher tends to pivot at these wheels. Similar to digging arch, this insertion arch pivoting reduces the force that can be used to force the boom and chain into the ground. However, if the invented device is added to a trencher, the result is a shift in the trencher's center of gravity to a point behind the two main wheels, thereby eliminating this pivot point. By eliminating this pivot point, a hydraulic system located on the trencher can be used to force the digging boom and chain into the ground. Additionally, the addition of the invented device's wheel(s) essentially serves as a fulcrum point allowing the trencher to better force the digging boom and chain into the ground.

Another benefit of the invented device is trench straightening. The use of a traditional trencher often results in the challenge of repeated realignment of the trencher within the direction of travel to achieve a straight trench. This is due to the fact that traditional trenchers are constantly and jarringly moved forward to rearward, side to side, and upward and downward due to the effects of digging arch and kickback. This movement often causes the trencher to drift away from a straight line of travel, thereby making the digging of a straight line difficult. Use of the invented device greatly reduces this off-line movement due to the reduction or even elimination of digging arch and kickback. Additionally, having an additional wheel(s) on the ground helps the user maintain a straight line by allowing the user to aim and direct the added wheel to follow the path of the trench desired to be dug.

The inventor envisions that the invented device will be installed on trenchers of the two main wheeled type at the factory, however, other installations are as well envisioned.

BRIEF DESCRIPTION OF THE DRAWINGS

FIG. 6 is a side, schematic, partial view of the device of FIG. 1, showing the disengagement flange located on the left linkage arm being moved from a locked position to an unlocked position.

DESCRIPTION OF THE PREFERRED EMBODIMENTS

In this application, the term "forward" means "toward the end of the trencher where the trailing wheel is located," "rearward" means "away from the end of the trencher where the trailing wheel is located," "distal" means "away from the center of the trencher," and "proximal" means "toward the center of the trencher."

Figure 1:
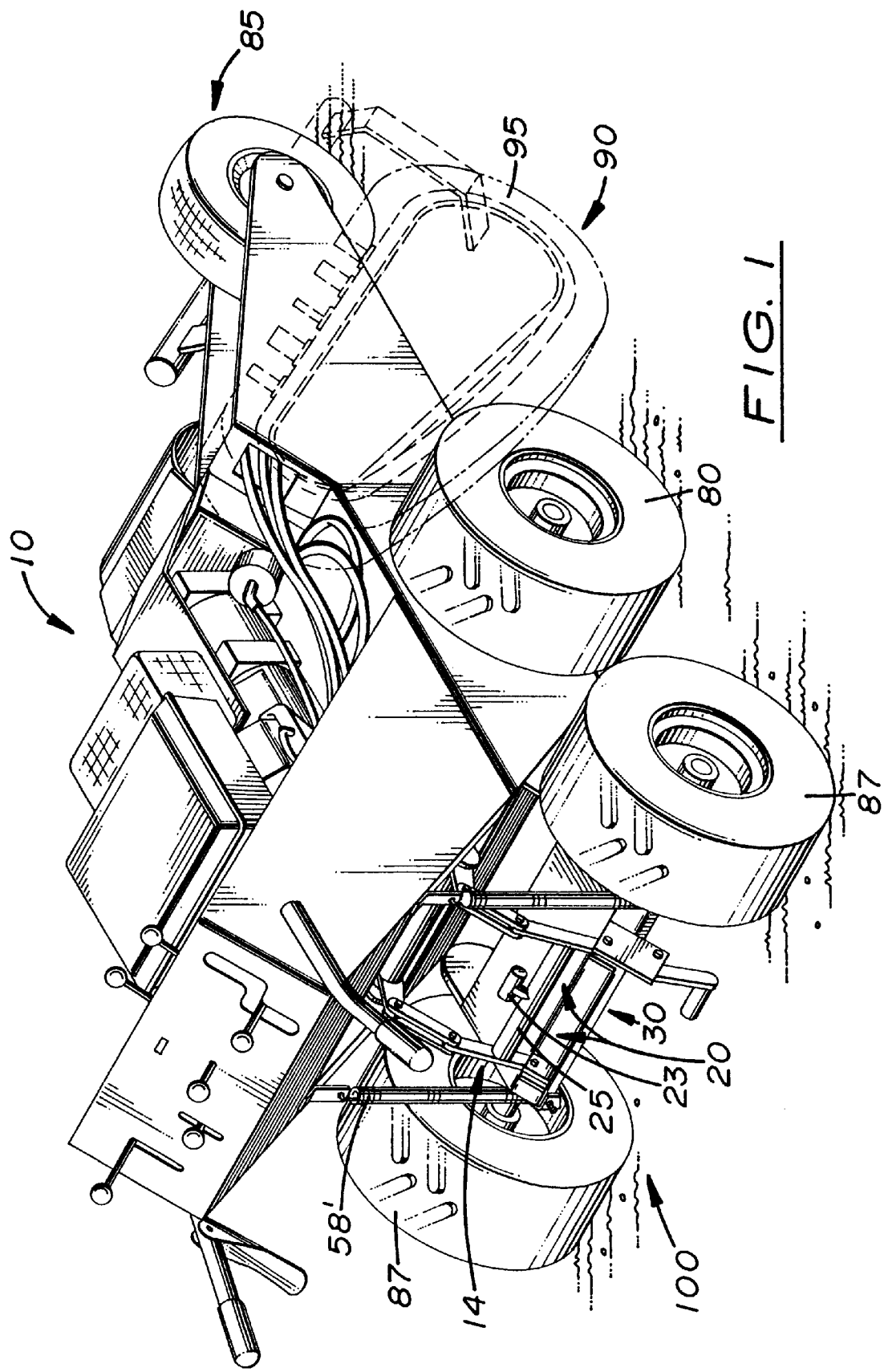
FIG. 1 is a side, perspective view of one embodiment of the invented retractable wheel assembly attached to a portable trencher with two main wheels and a smaller trailing wheel. This figure shows the assembly in the lower, stabilized position.

Referring to the Figures, there is depicted generally one, but not the only, embodiment of the invented retractable wheel assembly 100. As shown in FIG. 1, the invented device 100, is adapted for use on portable trenchers and other equipment. The equipment illustrated in FIG. 1 is a portable trencher 10 having a pair of main wheels 80, a trailing wheel 85, a trencher boom 90, and a digging chain 95. As shown in this figure, the invented retractable wheel assembly 100 is attached to the rear of the portable trencher 10, in alignment with the main wheels 80 and the trailing wheel 85.

Figure 2:
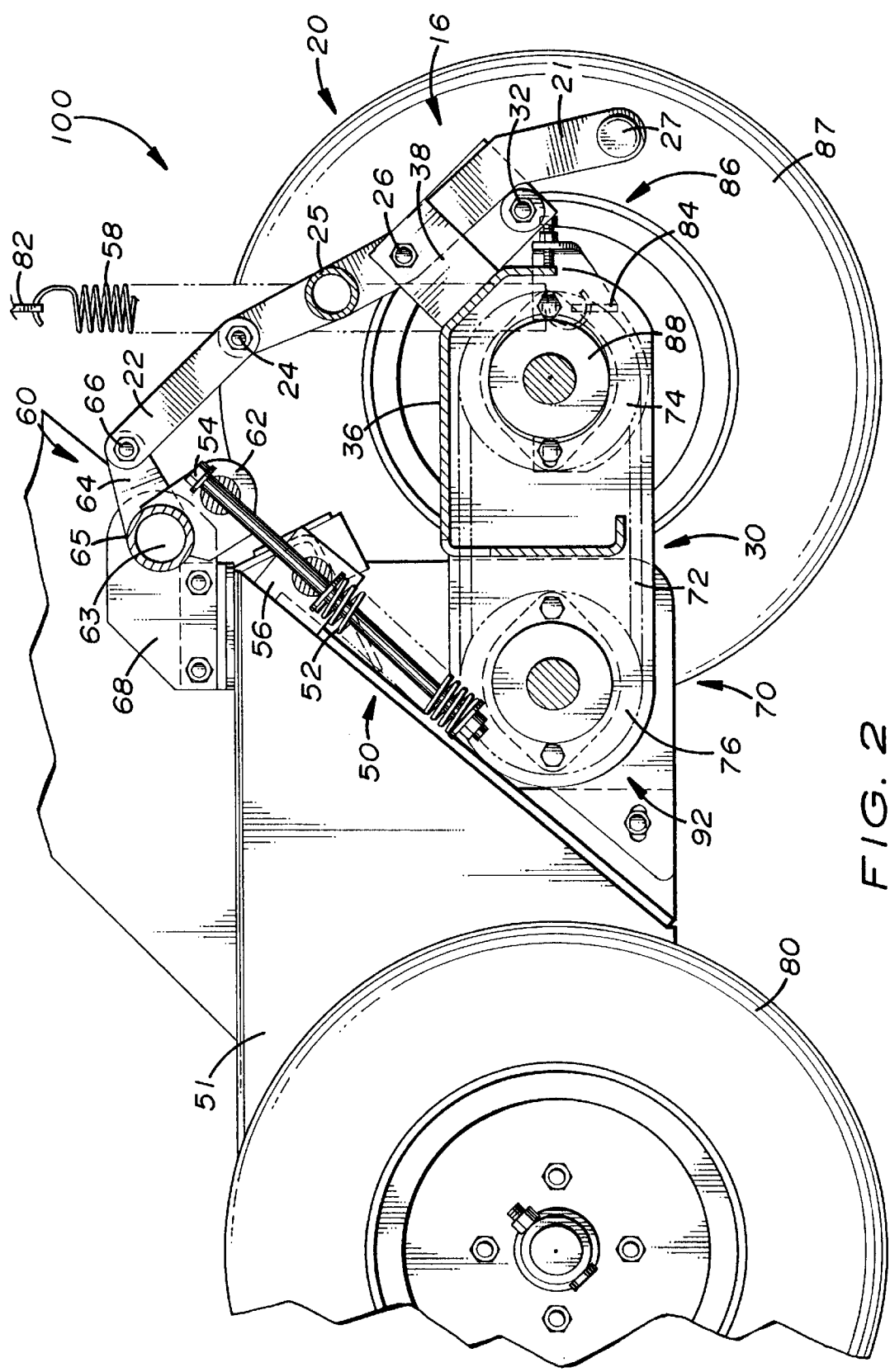
FIG. 2 is a is a partial, side view of the device of FIG. 1, showing the invented assembly in the lower, stabilized position.

As show in FIG. 2, the preferred embodiment of the invented device 100 comprises: a linkage system 20 for raising and lowering the invented device 100, a swing arm system 30 for mounting a wheel system and assisting the invented device 100 in swinging between an upper position to a lower position, and a retractable wheel system 86 for traction, support and stability. The preferred embodiment also preferably further comprises a drive system 70 and a suspension system 50.

The linkage system 20 comprises at least one linkage arm and a crank system 60. In the preferred embodiment, the linkage system 20 comprises a pair of linkage arms: a left linkage arm 14 and a right linkage arm 16, attached to a crank system 60. The left linkage arm 14 and the right linkage arm 16 are essentially mirror images of one another with the exception that the distal end of the lower linkage arm 21 of the right linkage arm 16 is elongated and has a toe kick bar 27 extending perpendicularly. Both of these differences are more thoroughly described infra.

The right linkage arm 16, as shown in FIG. 2, comprises a lower linkage arm 21 attached at a proximal end to the distal end of an upper linkage arm 22 at a linkage arm joint pivot 24. In the preferred embodiment, the upper linkage arm 22 comprises a pair of opposing arm pieces. The lower linkage arm 21 is further attached at a lower linkage pivot 26 to a linkage attachment 38, at or near the center of the lower linkage arm 21. The linkage attachment 38 is part of the swing arm system 30, discussed infra. A toe kick bar 27 extends perpendicularly from the right linkage arm 16 from near the distal end of the lower linkage arm 21. A lower support bar 25 extends perpendicularly from the lower linkage arm 21 at a point between the lower linkage pivot 26 and linkage arm joint pivot 24. The proximal end of the upper linkage arm 22 attaches to the upper crank arm 64 at an upper linkage pivot 66.

The left linkage arm 14 comprises a lower linkage arm 21' attached at a proximal end to the distal end of an upper linkage arm 22' at a linkage arm joint pivot 24'. In the preferred embodiment, the upper linkage arm 22' comprises a pair of opposing arm pieces. The lower linkage arm 21' is further attached at a lower linkage pivot 26' to a linkage attachment 38', at or near the proximal end of the lower linkage arm 21'. The linkage attachment 38' is part of the swing arm system 30, discussed infra. A lower support bar 25 extends perpendicularly from the lower linkage arm 21' at a point between the lower linkage pivot 26' and linkage arm joint pivot 24'. This lower support bar 25 extends between the left linkage arm 14 and the right linkage arm 16. The proximal end of the upper linkage arm 22' attaches to the upper crank arm 64' at an upper linkage pivot 66'. As shown in FIG. 6, a disengagement flange 23 connects perpendicularly the upper linkage arm 22' near the linkage arm joint pivot 24'. Another embodiment of a disengagement flange 23 is depicted in FIG. 1, this embodiment attaching to and extending from the lower support bar 25.

In the preferred embodiment, each crank system 60 comprises an upper crank arm 64, a crank pivot 63, a crank flange 68, and a lower crank arm 62. The upper crank arm 64 is attached to the proximal end of the upper linkage arm 22 at an upper linkage pivot 66. The upper crank arm 64 pivotally attaches at the crank pivot 63 to the crank flange 68. The crank flange 68 attaches to the trencher frame 51.

The linkage system 20 cooperates with the swing arm system 30 to assist the invented wheel system in retracting. This cooperation is described further infra.

In the preferred embodiment, the swing arm system 30 comprises a chain guard swing arm 36 attaching to the retractable wheel system 86 at a first end and attaching to the trencher body at a second end. The right linkage attachment 38 is attached to the right side of the generally rearward upper portion of the chain guard swing arm 36. The left linkage attachment 38' attaches to the left side of the rearwardly upper portion of the chain guard swing arm 36. These linkage attachments 38, 38' attach to the respective lower linkage arms 21, 21' at the respective lower linkage pivots 26, 26'. The right linkage attachment 38 also has a rearwardly mounted linkage arm stop 32. The stop 32 serves to stop the forward movement of the lower linkage arm 21 as the lower linkage arm 21 pivots at the lower linkage pivot 26.

Figure 3:
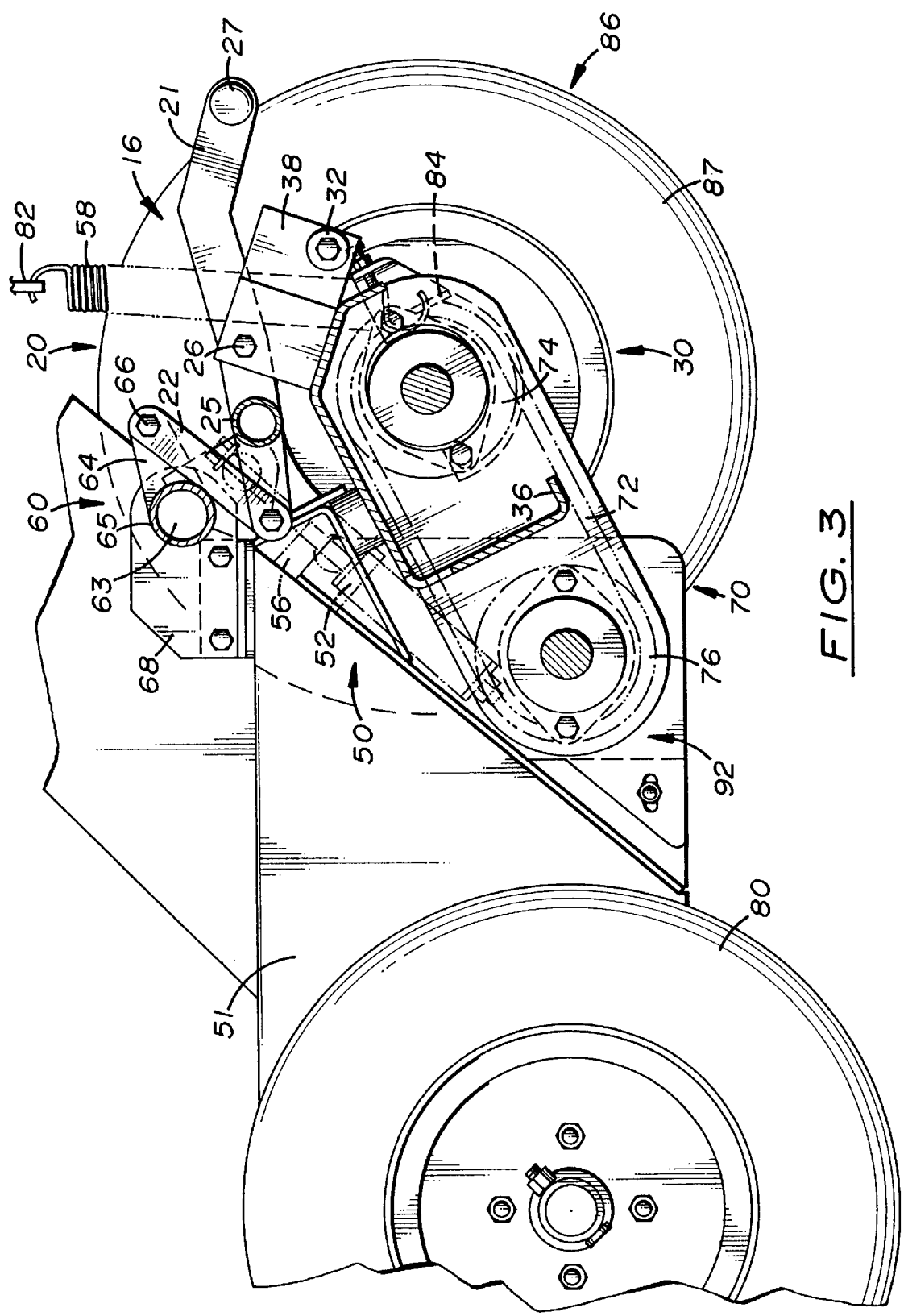
FIG. 3 is a partial, side view of the device of FIG. 1, showing the invented assembly in the upper, transport position.
Figure 4:
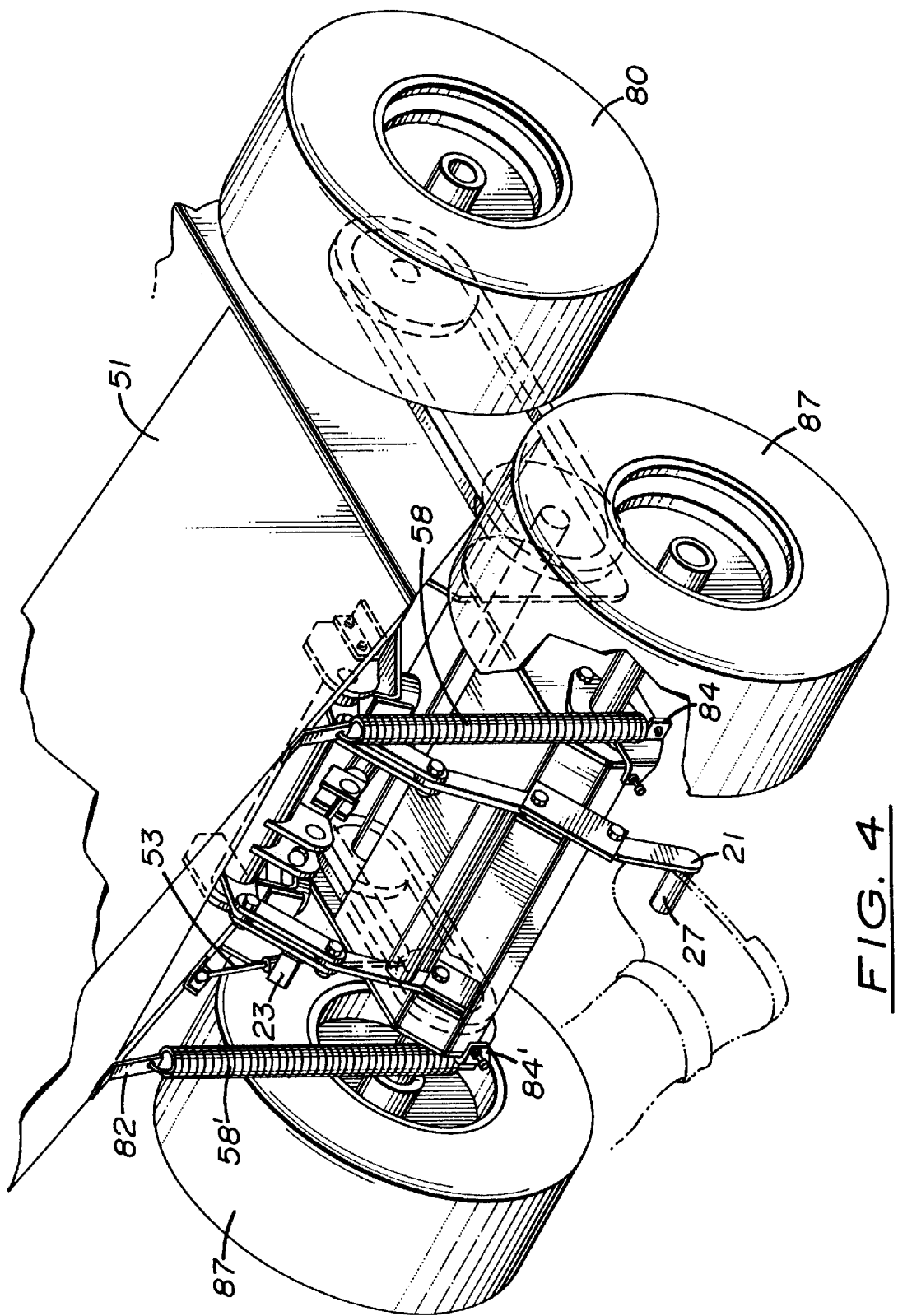
FIG. 4 is a rear, perspective view of the device of FIG. 1 in the lower position, showing the user's foot location after the toe kick bar had been depressed, thereby locking the device in the lower position.
Figure 5:
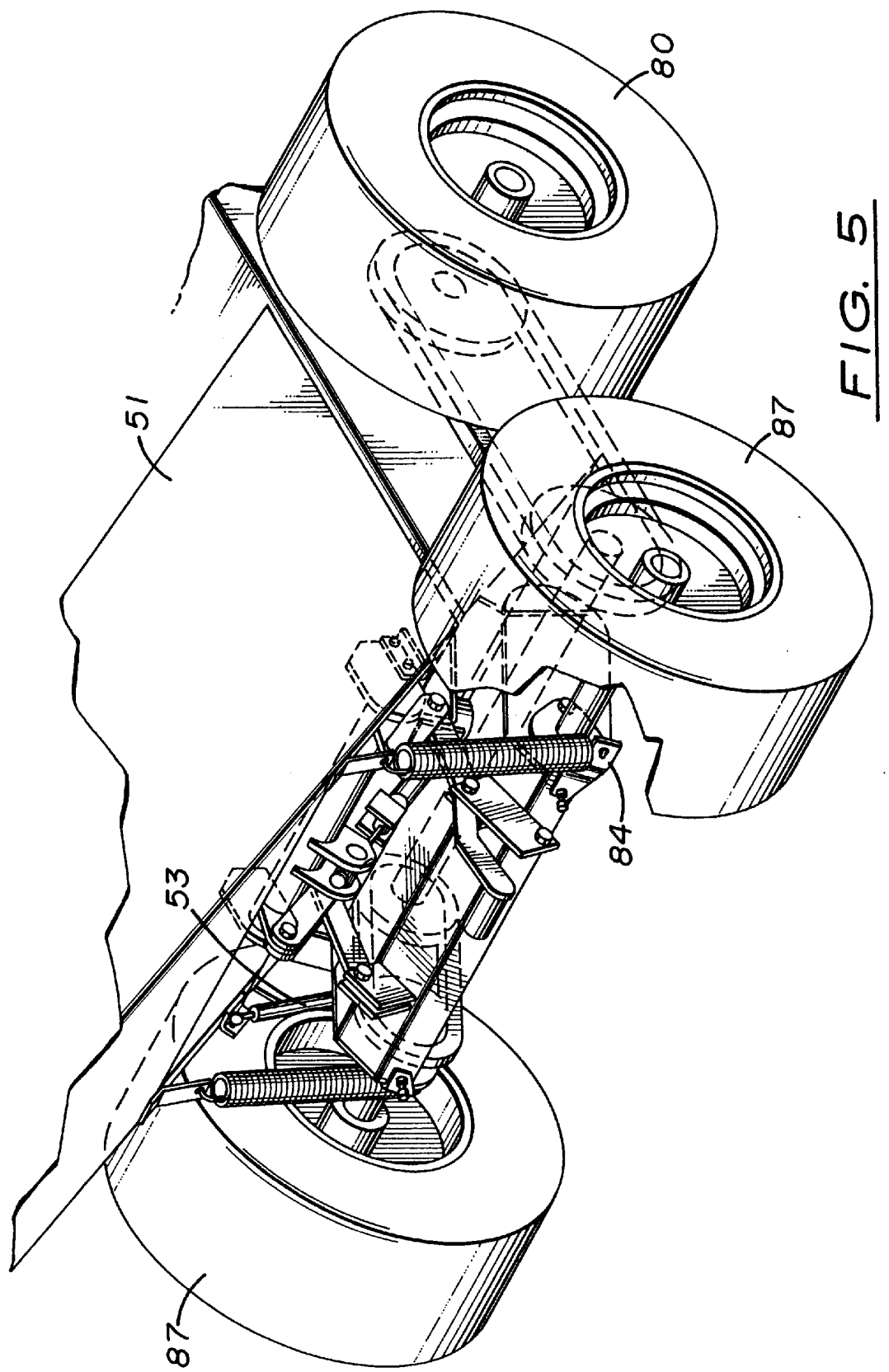
FIG. 5 is a rear perspective detail view of the device of FIG. 1 in the upper position.

The invented retractable wheel assembly 100 is able to be moved between an upper position (shown in FIG. 3) and a lower position (shown in FIG. 2). When the assembly 100 is the lower position, the linkage arm system 20 is locked into place by the hyper-extension of the right linkage arm 16 at the linkage arm joint pivot 24. This movement and locking in the lower position is described as follows: as the toe kick bar 27 is depressed by the user to move the assembly to the lower position, the right linkage arm pivots at the lower linkage pivot 26, the linkage arm joint pivot 24, and the upper linkage pivot 66. This pivoting continues until the lower linkage arm 21 contacts the mounted linkage arm stop 32 and until the upper support bar 65, attached to the upper linkage arm 22 and the crank system 60 at the upper linkage pivot 66, rotates to its rotational limit or stop. This rotational limit or stop is the furthest position within the vertical plane that the crank pivot 63 allows the upper crank arm 64 to pivot. When the pivoting of the lower linkage arm 21 continues to these two stops, the linkage arm joint pivot 24 is extended to a point resulting in the hyper-extension of the lower linkage arm 21 and the upper linkage arm 22. The consequent locking of the device 100 into the downward, lower position is illustrated by position A in FIG. 6.

If the user wishes to move the assembly 100 from the lower position to the upper position, the user must first push in, forward, on the disengagement flange 23 which is perpendicularly attached to the upper linkage arm 22' near the linkage arm joint pivot 24'. As shown in FIG. 6, this action serves to unlock arm system 20 by pushing the lower linkage arm 21 and the upper linkage arm 22 into position B in FIG. 6. The retraction springs 58, 58' then automatically lift the retractable wheel 87 into the upper position. As the assembly 100 is raised, the chain guide swing arm 36, which is attached to the linkage arm system 20, pivots along its attachment at the trencher body. Another embodiment of the present invention, shown in FIG. 1, has the disengagement flange 23 located on the lower support bar 25. As such, pushing in, or forward, on the disengagement flange 23 unlocks the arm system 20 and allows the retraction springs 58, 58' to automatically lift the retractable wheel 87 into the upper position.

In the preferred embodiment, the retractable wheel system 86 comprises at least one retractable wheel 87, and a wheel attachment means 88. The wheel 87 attaches to the swing arm system 30 by the wheel attachment means 88. The wheel attachment means 88, at a rear drive sprocket 74, attaches the swing arm system 30 to the drive system 70.

In the preferred embodiment, the drive system 70 comprises a chain 72 running between a rear drive sprocket 74 and a driven front drive sprocket 76. Other drive means are envisioned by the inventor, including belts and gears. Alternatively and less preferredly, the wheel 87 may not be connected to a drive system. The rear drive sprocket 74 is attached to the wheel attachment means 88.

In the preferred embodiment, the suspension system 50 comprises at least one retraction spring 58, a suspension spring 52, and/or at least one shock absorber 53. The suspension spring 52 attaches at one end to the trencher frame 51 and at the other end to lower crank arm 62 located on the upper support bar 65 by a suspension spring attachment 54. The shock absorber 53 attaches to the trencher frame 51 at a point generally above the retractable wheel 87 and attaches to the retractable wheel system 86 at or near the front of the retractable wheel 87 on the chain guard swing arm 36. The retraction spring 58 attaches at a first end to the trencher frame 51 directly above the invented assembly 100 at an upper spring attachment 82. The retraction spring 58 attaches at a second end to the lower spring attachment 84 which is attached to the base of the chain guard swing arm 36. The preferred embodiment uses a pair of retraction springs 58, 58' connected to upper spring attachments 82, 82' and lower spring attachments 84, 84'. Said upper spring attachments 82, 82' are located on the upper trencher body. The shock absorber 53 and the suspension spring 52 serve to dampen vibrations and movement of the trencher 10 in relation to the invented retractable wheel assembly 100.

While the preferred embodiment discloses a linkage arm type arm for maneuvering the apparatus 100 from a lower to an upper position and vice versa, it is envisioned by the inventor that other arms may also be used. Examples of such arms include articulated arms, pivoting arms, sliding arms and hinged arms. Alternatively, a non-wheeled assembly may be included in the broad disclosure of the invention, for example, a bracing arm extending from the trencher to the rear and to the ground for providing many of the benefits of the wheeled version.

Although this invention has been described above with reference to particular means, materials and embodiments, it is to be understood that the invention is not limited to these disclosed particulars, but extends instead to all equivalents within the scope of the following claims.

I claim:

1. A walk-behind power unit stabilizing system comprising:

a walk-behind trencher power unit having a front side, a rear side, a trenching boom at the front side, and a rear drive wheel at the rear side of the power unit; and, a retractable assembly connected to the rear side of said power unit and extending rearward behind the rear drive wheel and downward from the rear side of the power unit, said retractable assembly contacting the ground in a lower position and limiting digging arch and kickback of said walk-behind power unit when the trenching boom strikes buried obstacles during removal of dirt from the ground to form a linear trench, wherein the retractable assembly is adapted to be temporarily raised above the rear drive wheel to an upper position to facilitate pivoting and steering of said walk-behind power unit during transport of the power unit;

said stabilizing system comprising a lock holding the retractable assembly in the lower position contacting the ground, and a retraction spring automatically retracting the retractable assembly into an upper position when the lock is unlocked.

2. The walk-behind power unit stabilizing system as in claim 1, wherein the retractable assembly pivots up and away from the power unit rear drive wheel.

3. The walk-behind power unit stabilizing system as in claim 1, wherein the stabilizing system further comprises a retractable wheel and a drive system powering the retractable wheel, so that both the rear drive wheel and the retractable wheel are powered.

4. The walk-behind power unit stabilizing system as in claim 1, wherein said power unit has a length between the front side and the rear side and a lateral width perpendicular to the length, wherein the boom lies in a plane parallel to the power unit length and removes dirt, debris, asphalt or construction materials to form a linear trench parallel to said length; and wherein the retractable assembly has a retractable wheel parallel to said length and laterally offset from the plane of the boom.

5. The walk-behind power unit stabilizing system as in claim 4, further comprising two retractable wheels laterally spaced and not co-planar with the plane of the boom.

6. The walk-behind power unit stabilizing system as in claim 4, further comprising a foot operated toe-kick-bar adapted to unlock and lock the retraction assembly.

7. The walk-behind power unit stabilizing system as in claim 1, wherein the retractable assembly comprises a retractable wheel assembly.

8. The walk-behind power unit stabilizing system as in claim 7, wherein said retractable wheel assembly comprises:
a retractable wheel system for traction, support and stability of a trencher;
a linkage arm system for raising and lowering the retractable wheel system; and,
a swing arm system for mounting said retractable wheel system on the power unit, said swing arm system attaching to said linkage arm system.

9. The walk-behind power unit stabilizing system as in claim 8, wherein said linkage arm system comprises at least one linkage arm and a crank system.

10. The walk-behind power unit stabilizing system as in claim 9, wherein said linkage arm system further comprises a left linkage arm and a right linkage arm.

11. The walk-behind power unit stabilizing system as in claim 10, wherein said left linkage arm comprises:
a lower linkage arm;
an upper linkage arm;
wherein a proximal end of said lower linkage arm attaches to a distal end of said upper linkage arm at a linkage arm joint pivot;
wherein the lower linkage arm further attaches at the center of said lower linkage arm to said swing arm system at a lower linkage pivot;
wherein a lower support bar extends perpendicularly between said left linkage arm and said right linkage arm at a point between said lower linkage pivot and said linkage arm joint pivot;
wherein a proximal end of the upper linkage arm attaches to an upper crank arm at an upper linkage pivot; and,
wherein said upper linkage arm has a disengagement flange for disengagement of a locked lower position, wherein pushing inward upon said disengagement flange results in said assembly being unlocked from a lower position.

12. The walk-behind power unit stabilizing system as in claim 11, wherein said crank system comprises:
an upper crank arm attaching at a first end to a proximal end of said upper linkage arm at said upper linkage pivot;
said upper crank arm pivotally attaching at a second end at a crank pivot to a crank flange; and,
said crank flange further attached to a trencher frame.

13. The walk-behind power unit stabilizing system as in claim 8, wherein said swing arm system further comprises:
a chain guard swing arm for attaching the retractable wheel system to the trencher, said chain guard swing arm able to pivot at an attachment with said trencher;
a linkage attachment attaching to the generally rearward upper portion of the chain guard swing arm for allowing the attachment of a lower linkage arm at a lower linkage pivot; and,
a rearwardly mounted linkage arm stop.

14. The walk-behind power unit stabilizing system as in claim 13, wherein said swing arm system further comprises two linkage attachments.

15. The walk-behind power unit stabilizing system as in claim 8, wherein said retractable wheel system comprises a retractable wheel and a wheel attachment means.

16. The walk-behind power unit stabilizing system as in claim 8, said retractable wheel assembly further comprises a suspension system.

17. A walk behind power unit stabilizing system comprising:
a walk-behind trencher power unit having a front side, a rear side, and a rear drive wheel at the rear side of the power unit; and,
a retractable assembly connected to the rear side of the power unit and extending rearward behind the rear drive wheel and downward from the rear side of the power unit, said retractable assembly contacting the ground in a lower position to increase stability of said walk-behind power unit, wherein the retractable assembly is adapted to be temporarily raised above the rear drive wheel to an upper position for transport of said walk-behind power unit;
wherein said retractable assembly includes a retractable wheel system having a linkage arm for raising and lowering the retractable wheel system and a swing arm for mounting said retractable wheel system on the power unit, said swing arm attaching to said linkage arm;
said linkage arm system comprising at least a right linkage arm, a left linkage arm and a crank system;
wherein said right linkage arm comprises:
a lower linkage arm;
an upper linkage arm;
wherein a proximal end of said lower linkage arm attaches to a distal end of said upper linkage arm at a linkage arm joint pivot;
wherein the lower linkage arm further attaches at or near the center of said lower linkage arm to said swing arm system at a lower linkage pivot;
wherein a toe kick bar extends perpendicularly from at or near the distal end of the lower linkage arm, wherein the depression of said toe kick bar results in said assembly being locked into a lower position through the hyper-extension of said right linkage arm at said linkage arm joint pivot;
wherein a lower support bar extends perpendicularly between said left linkage arm and said right linkage arm at a point between said lower linkage pivot and said linkage arm joint pivot; and,
wherein a proximal end of the upper linkage arm attaches to an upper crank arm at an upper linkage pivot.

18. The walk-behind power unit stabilizing system as in claim 17, wherein said crank system comprises:
an upper crank arm attaching at a first end to a proximal end of said upper linkage arm at said upper linkage pivot;
said upper crank arm pivotally attaching at a second end at a crank pivot to a crank flange; and,
said crank flange further attached to a trencher frame.

19. A walk behind power unit stabilizing system comprising:
- a walk-behind trencher power unit having a front side, a rear side, and a rear drive wheel at the rear side of the power unit; and
- a retractable wheel assembly comprising a suspension system connected to the rear side of the power unit and extending rearward behind the rear drive wheel and downward from the rear side of the power unit, said retractable wheel assembly contacting the ground in a lower position to increase stability of said walk-behind power unit, wherein the retractable wheel assembly is adapted to be temporarily raised above the rear drive wheel to an upper position for transport of said walk-behind power unit,
- wherein said retractable wheel assembly includes a wheel system and a linkage arm for raising and lowering the wheel system and a swing arm for mounting said wheel system on the power unit, said swing arm attaching to said linkage arm;

said suspension system further comprises:
- a suspension spring;
- said suspension spring attaching at one end to a trencher frame and at a second end to a lower crank arm through use of a suspension spring attachment; and,
- a shock absorber;
- said shock absorber attaching at one end to the trencher frame and at a second end to the swing arm system at a chain guard swing arm.

20. The walk-behind power unit stabilizing system as in claim 19, wherein said suspension system further comprises:
- at least one retraction spring;
- said retraction spring connecting said swing arm to an upper portion of the trencher frame;
- said retraction spring raising the retractable wheel system from a lower position to an upper position when said wheel system is unlocked.

* * * * *